(12) United States Patent
Hamamoto et al.

(10) Patent No.: US 9,043,804 B2
(45) Date of Patent: May 26, 2015

(54) PARALLEL COMPUTER SYSTEM AND PROGRAM

(75) Inventors: Masaki Hamamoto, Kokubunji (JP); Tetsuya Yamada, Sagamihara (JP); Atsushi Tomoda, Mitaka (JP); Atsushi Miyamoto, Kokubunji (JP)

(73) Assignee: HITACHI, LTD., Tokyo (JP)

( * ) Notice: Subject to any disclaimer, the term of this patent is extended or adjusted under 35 U.S.C. 154(b) by 480 days.

(21) Appl. No.: 13/437,523

(22) Filed: Apr. 2, 2012

(65) Prior Publication Data

US 2012/0254881 A1    Oct. 4, 2012

(30) Foreign Application Priority Data

Apr. 4, 2011    (JP) .................................. 2011-083098

(51) Int. Cl.
| | |
|---|---|
| G06F 9/46 | (2006.01) |
| G06F 9/52 | (2006.01) |
| G06F 9/48 | (2006.01) |

(52) U.S. Cl.
CPC .............. G06F 9/522 (2013.01); G06F 9/4887 (2013.01)

(58) Field of Classification Search
CPC ................................ G06F 9/522; G06F 9/4887
See application file for complete search history.

(56) References Cited

U.S. PATENT DOCUMENTS

| | | | | |
|---|---|---|---|---|
| 5,701,439 A | * | 12/1997 | James et al. | ..................... 703/17 |
| 5,721,921 A | * | 2/1998 | Kessler et al. | ................ 718/102 |
| 2013/0205301 A1 | * | 8/2013 | Easwaran et al. | ............. 718/104 |

FOREIGN PATENT DOCUMENTS

| | | |
|---|---|---|
| JP | 2001-015966 A | 2/2001 |
| JP | 2005-071280 A | 3/2005 |

\* cited by examiner

*Primary Examiner* — Lewis A Bullock, Jr.
*Assistant Examiner* — Kevin X Lu
(74) *Attorney, Agent, or Firm* — Mattingly & Malur, PC

(57) ABSTRACT

There is provided a parallel computer system for performing barrier synchronization using a master node and a plurality of worker nodes based on the time to allow for an adaptive setting of the synchronization time. When a task process in a certain worker node has not been completed by a worker determination time, the particular worker node performs a communication to indicate that the process has not been completed, to a master node. When the communication has been received by a master determination time, the master node performs a communication to indicate that the process time is extended by a correction process time, in order to adjust and extend the synchronization time. In this way, it is possible to reduce the synchronization overhead associated with the execution of an application with a relatively large variation in the process time from a synchronization point to the next synchronization point.

16 Claims, 10 Drawing Sheets

FIG. 11

| TASK PROCESS ID | NUMBER OF PROCESS TIME EXTENSIONS (N_adj) | NUMBER OF PROCESS TIME EXTENSION REPETITIONS (N_stg) | NUMBER OF PROCESS TIME NON-EXTENSION REPETITIONS (N_stg_n) | BASIC PROCESS TIME (T) | CORRECTION PROCESS TIME (ΔT) |
|---|---|---|---|---|---|
| 1 | 5 | 1 | 0 | UNCHANGED | INCREASED |
| 2 | 1 | 2 | 0 | INCREASED | DELETED |
| 3 | 5 | 3 | 0 | INCREASED | INCREASED |
| 4 | 0 | 0 | 1 | UNCHANGED | UNCHANGED |
| 5 | 0 | 0 | 2 | DELETED | UNCHANGED |

1100

TIME →

PARALLEL COMPUTER SYSTEM AND PROGRAM

CLAIM OF PRIORITY

Present application claims priority from Japanese patent application JP2011-83098 filed on Apr. 4, 2011, the content of which is hereby incorporated by reference into this application.

BACKGROUND OF THE INVENTION

The present invention relates to a parallel computer system that uses master and worker nodes to perform computation process by repeating parallel process and synchronization process. The present invention also relates to barrier synchronization of such a parallel computer system.

The recent remarkable progress in IT devices, such as storage and network, has resulted in the increase in the magnitude of the problem to be addressed and in the size of the data to be processed. This leads to a growing demand for computer systems having more powerful processing capability to perform processes such as, for example, Fast Furrier Transform process, process using genetic algorithm, and simulation process. However, after the operation frequency of microprocessor has peaked in 2004, the approach to improve the processing capability of the computer system has been greatly changed from the approach to high frequency application to the application to large scale parallelization. For this reason, the parallelization processing technology will be more and more important in the future computer system.

In general, the computer system for performing large-scale parallel process is configured as a computer cluster having plural servers connected via a high-speed network. The computer cluster generally includes a master node for managing the flow of the computation process, and plural worker nodes (also referred to as slave nodes) for actually performing the computation process. This is called master-worker method. The master-worker method achieves parallel process through implementation of a computation process (hereinafter referred to as task) assignment to the worker nodes from the master node, a task process on the worker nodes, and a synchronization process (called barrier synchronization) for waiting for the completion of the task process assigned to all the worker nodes. Here, the synchronization process has an important role in terms of ensuring the order of operations in a program. In general, the synchronization process is realized by a communication process (called synchronous communication) to the master node from the worker node that has completed the task process, and by checking whether the entire task process is completed by the flag management and the use of a counter on the master node (hereinafter referred to as counting process). Note that the task process is the process that the worker node should complete during the period from a synchronization point to the next synchronization point.

Examples of documents describing the processing technology of the related art include Japanese Patent Application Laid-Open Publication Nos. 2001-51966 and 2005-71280.

BRIEF SUMMARY OF THE INVENTION

In the parallel process, the synchronization is a major disincentive to improve the processing capability. This is because when the number of parallels or worker nodes is increased, the load on the master node in the synchronization process increases, resulting in the increase in synchronization time. Particularly in the processes such as the Fast Furrier Transform process, the simulation process, and the process using genetic algorithm, task process and synchronization process are repeated many times at short intervals of a few milliseconds by using a very large number of worker nodes. For this reason, the overhead associated with the synchronization process (namely, the synchronization overhead) can be considerable.

Further, in the future large scale computer system with several hundred thousands of nodes or more, the synchronization overhead will seriously get in the way of improving the processing capability. For example, the synchronization overhead (namely, the synchronization time) can be calculated by the sum of the synchronous communication time and the counting time. Assuming that the counting time on the master node for one worker node is 10 nanoseconds, it will be necessary to take 10 milliseconds to complete only the counting process for one million worker nodes. So it is found that the computation efficiency is very low.

The increase in the synchronization time (synchronization overhead) associated with the increase in the number of nodes is the fundamental problem in the computer system that performs synchronization process through synchronous communication and counting process. It is difficult to solve this problem by the synchronization technology disclosed in Japanese Patent Application Laid-Open Publication No. 2001-51966 that uses layered worker nodes without using a specific master node. In order to overcome the above problem, Japanese Patent Application Laid-Open Publication No. 2005-71280 discloses a synchronization technology (hereinafter, conventional technology). The conventional technology is a synchronization technology that can completely eliminate the synchronous communication and the counting process by performing synchronization based on the time at predetermined time intervals, so that the number of nodes and the synchronization time are independent of each other.

In the conventional technology, the synchronization time is set to be able to perform synchronization without breakdown by ensuring that the time interval is greater than the process time of the worst case in the task process of each worker node. Here, the worst case corresponds to the situation of selecting the branch destination that maximizes the process time in the task process, in which all memory accesses are cache misses. Thus, the conventional technology is effective in real time simulation for executing the programming instructions that are optimized to reduce the variation in the process time and to complete the task process within a predetermined period of time. However, for an application with a relatively large variation in the task process time, it is necessary to set a large synchronization time interval by taking into account the process time of the worst case which rarely occurs. Thus, in the conventional technology, there is a problem that the synchronization overhead increases. In other words, the conventional technology has a problem that the synchronization overhead increases for the application with a relatively large variation in the task process time.

An object of the present invention is to address the problem in the conventional technology by providing a parallel computer system and program that can prevent the increase in the synchronization overhead to achieve high speed parallel process.

In order to achieve the above object, according to an aspect of the present invention, there is provided a parallel computer system for performing parallel computation by connecting plural computing units via a network. The computing unit serves as a master node for performing synchronization process or as a worker node for performing task process. The master node sets a master determination time with the expectation that the task process in all worker nodes is completed within a basic process time. Then, the master node transmits a process start notification to plural worker nodes. At the master determination time, the master node checks whether a process-not-completed notification is received from the worker node. When the process-not-completed notification is received, the master node transmits a process extension notification to the plural worker nodes. On the other hand, when the process-not-completed notification is not received, the master node transmits a synchronization completion notification to the plural worker nodes. When the process start notification or the synchronization completion notification is received from the master node, the worker node sets a worker determination time by using the basic process time. At the worker determination time, when the task process is not completed, the worker node transmits the process-not-completed notification to the master node. On the other hand, when the task process is completed, the worker node waits for the synchronization completion notification from the master node.

Further, to achieve the above object, in the parallel computer system according to another aspect of the present invention, if the task process in at least one worker node is not completed within the basic process time, the master node redefines the master determination time by using a correction process time. Then, when the process extension notification is received from the master node, the worker node redefines the worker determination time by using the correction process time.

In order to achieve the above object, according to another aspect of the present invention, there is provided a program to be executed by a processor of a parallel computer system for performing parallel computation by connecting plural computing units via a network. Each of the computing units includes the processor and a storage unit. The computer unit serves as a master for performing synchronization process or as a worker node for performing task process. The program causes the processor of the computing unit serving as the master node to set a master determination time with the expectation that task process in all the worker nodes is completed within a basic process time, transmit a process start notification to plural worker nodes, and check whether a process-not-completed notification is received from worker node at the master determination time. When the process-not-completed notification is received, the program causes the processor of the master node to transmit a process extension notification to the plural worker nodes, and if not, to transmit a synchronization completion notification to the plural worker nodes. Further, when the process start notification or the synchronization completion notification is received from the master node, the program causes the processor of the computing unit serving as the worker node to set a worker determination time by using the basic process time. When the task process has not been completed at the worker determination time, the program causes the worker node to transmit the process-not-completed notification to the master node. When the task process has been completed at the worker determination time, the program causes the worker node to wait for the synchronization completion notification from the master node.

Further, to achieve the above object, according to another aspect of the present invention, when the task process in at least one worker node is not completed within the basic process time, the program causes the processor of the computing unit serving as the master node to redefine the master determination time by using a correction process time. Further, when the process extension notification is received from the master node, the program causes the processor of the computing unit serving as the worker node to redefine the worker determination time by using the correction process time.

Accordingly, it is desirable to reduce synchronization overhead in the execution of the application with a relatively large variation in task process time in each worker node by using the parallel computer system having a very large number of worker nodes, in order to achieve a fast parallel process.

BRIEF DESCRIPTION OF THE DRAWINGS

FIG. 11 is a view of a task process table according to the first embodiment.

DETAILED DESCRIPTION OF THE INVENTION

According to the present invention, a predetermined time is set. Then, a process-not-completed notification is transmitted to the master node from only the worker node that has not completed the task process by the predetermined time, to allow the master node to know the task process state of the worker node. If a certain worker node has not completed the task process, the master node transmits a notification to extend the process time (a process extension notification) to all worker nodes. Thus, the synchronization time can be delayed thereby achieving an adaptive synchronization time setting according to the task process state. Further, when knowing that all worker nodes have completed the task process at the predetermined time, the master node transmits a synchronization completion notification to all the worker nodes. In response to the synchronization completion notification, the worker nodes set the next predetermined time to start the next task process.

Then, in the present invention, it is possible to adaptively set the synchronization time according to the task process state by newly adding the communication of synchronization completion notification and process extension notification from the master node to all the worker nodes, as well as the communication of process-not-completed notification from the worker node to the master node. As a result, the above program can be solved. Here, the synchronization completion notification and the process extension notification are broadcast communication. Thus, the communication time is not dependent on the number of worker nodes, so that high speed operation can be achieved. Further, the process-not-completed notification is the communication only from the worker node in which the process is not completed. The master node can determine the process time extension by receiving only one process-not-completed notification. Thus, the communication time is not dependent on the number of worker nodes, so that high speed operation can be achieved. For this reason, the time required for the newly added communications, namely, the synchronization overhead in this method, is much smaller than the synchronization overhead in the conventional technology. As a result, the overall synchronization overhead according to this embodiment can be reduced compared to the conventional technology. Further, in the case of the application with a relatively large variation in the process time, it is also possible to perform parallel computation with a small synchronization overhead, while the number of worker nodes and the synchronization overhead are independent of each other.

Hereinafter, an embodiment of the present invention will be described with reference to the accompanying drawings.

First Embodiment

Figure 1:
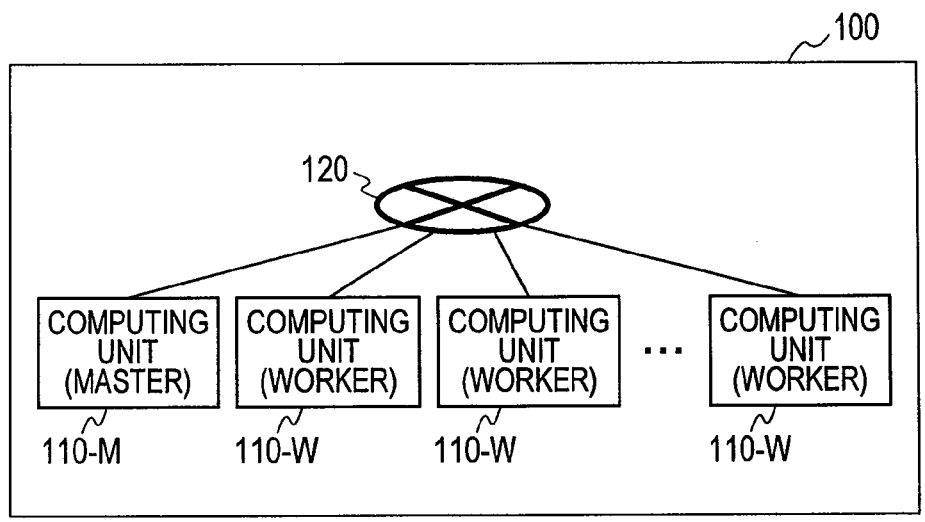
FIG. 1 is a diagram showing a configuration of a parallel computer system according to a first embodiment of the present invention.

FIG. 1 shows the configuration of a parallel computer system 100 to which a first embodiment is applied. The parallel computer system 100 according to this embodiment includes plural computing unites 110, and a network 120 connecting the computing unites 110 to each other. The computing unit 110 is a general server (computer). The internal configuration of the computing unit 110 will be described below with reference to FIGS. 8A and 8B. Also, the network 120 is a general network. For example, the network 120 is realized by Ethernet (registered trademark), InfiniBand, and the like. Further, the parallel computer system 100 according to this embodiment performs parallel computation by a master/worker method. In the master/worker method, as shown in FIG. 1, one of the computing units 110 is designated as a master node (110-M) and the other computing units are designated as worker nodes (110-W).

This embodiment aims at a synchronization system and realization method of barrier synchronization that is required to perform parallel computation using the parallel computer system 100. Hereinafter, the barrier synchronization and the realization method according to this embodiment will be described.

First, the barrier synchronization according to this embodiment will be described.

In the barrier synchronization according to this embodiment, a synchronization determination time is set with the expectation that task process in all the worker nodes are completed within a predetermined time (which is determined as a basic process time T). Then, the master node performs a synchronization determination according to the task process state of the worker nodes at the synchronization determination time. The understanding of the task process state can be done by transmitting a process-not-completed notification from a worker node to the master node only when the worker node does not complete the task process within the basic process time T. In other words, if the master node does not receive the process-not-completed notification by the synchronization determination time, it is determined that the task process has been completed in all the worker nodes.

Figure 2:
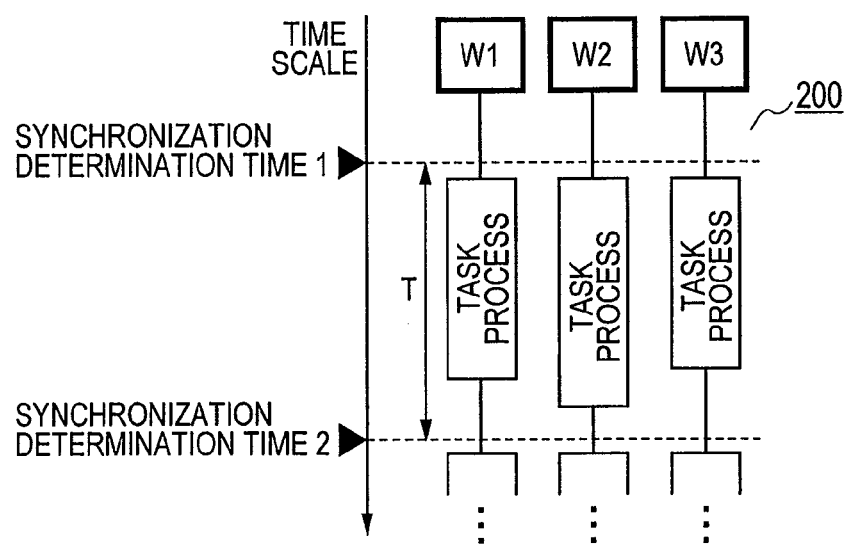
FIG. 2 is a time chart illustrating the operation when all worker nodes have completed the task process by a synchronization determination time.
Figure 3:
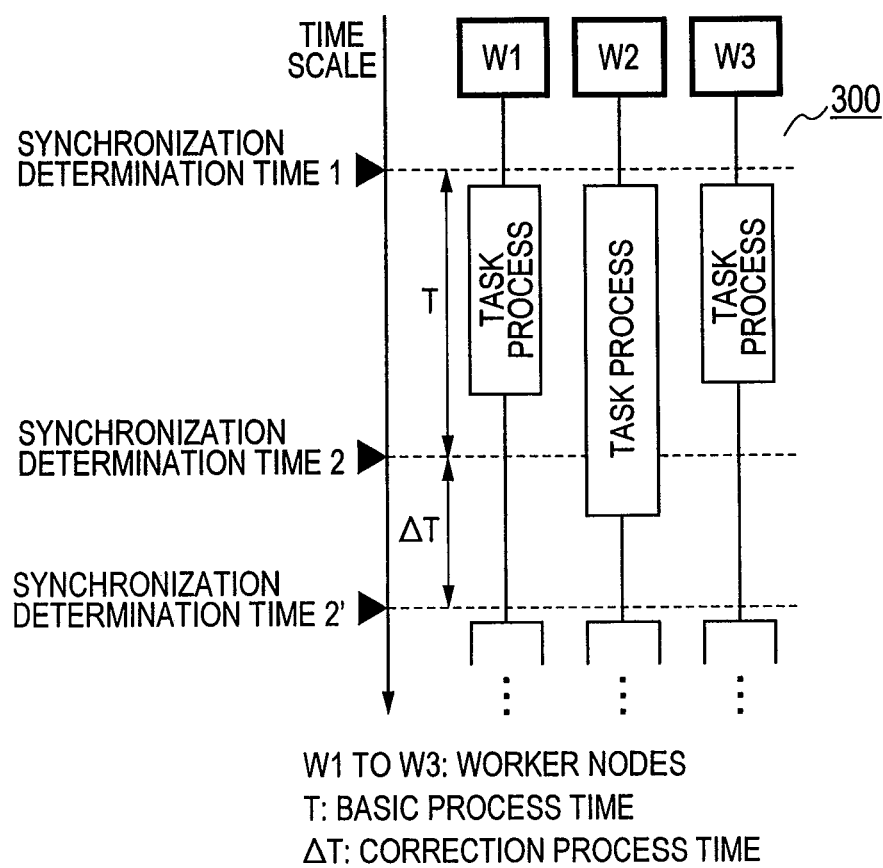
FIG. 3 is a time chart illustrating the operation when a certain worker node has not completed the task process by the synchronization determination time.

FIGS. 2 and 3 show the outline of the barrier synchronization according to this embodiment. FIG. 2 is a time chart 200 showing the operation when all the worker nodes have completed the task process by the synchronization determination time. In this case, the synchronization has been completed at a synchronization determination time 2, and the system proceeds to the next task process.

On the other hand, FIG. 3 shows a time chart 300 showing the operation when a certain worker node has not completed the task process by the synchronization determination time. In this case, the synchronization determination time 2 is extended by a predetermined extension time (which is defined as a correction process time $\Delta T$), which is defined as a synchronization determination time 2'. Then, the master node performs again the synchronization determination at the synchronization determination time 2'. In the example of FIG. 3, the synchronization has been completed at the synchronization determination time 2', and the system proceeds to the next task process. Here, the basic process time T and the correction process time $\Delta T$ are set values that are described in the program of the application.

This is the outline of the synchronization method according to this embodiment.

Next, details of the barrier synchronization will be described. The barrier synchronization in this embodiment is applied to the two cases: (a) all the worker nodes have completed the process by the synchronization determination time; and (b) a certain worker node has not completed by the synchronization determination time.

Note that in the following description, it is assumed that the program is executed by the computing units to perform the Fast Furrier Transform process, the simulation process, and the process using generic algorithm. These processes have the following features:

Single Program Multiple Data (SPMD) type is used to allow all the worker nodes to execute the same program;

The destination of the communication, such as intermediate result data transfer process after the completion of the synchronization, is fixed in advance; and The worker nodes repeat task process and synchronization process for a specified number of times.

Description of (a)

Figure 4:
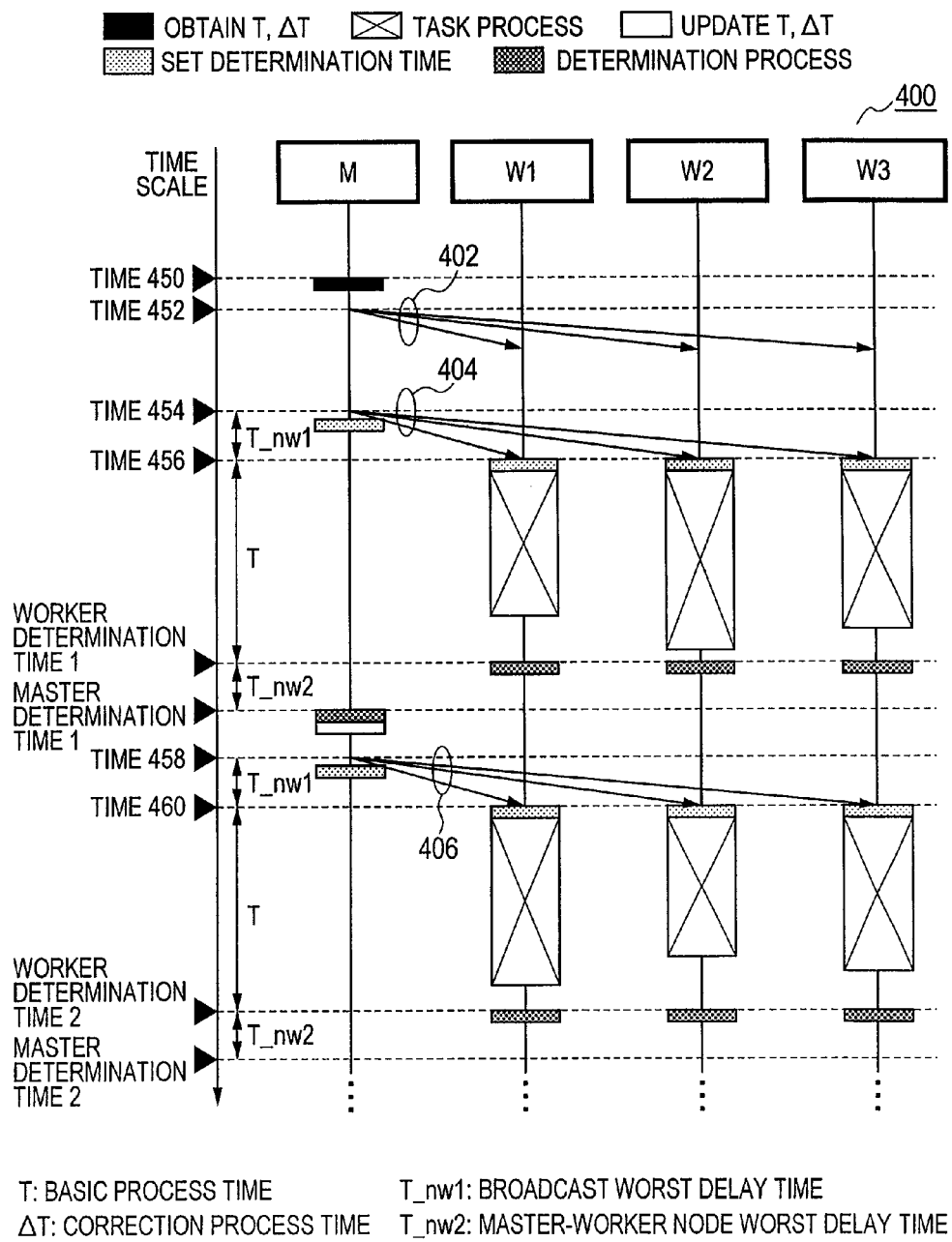
FIG. 4 is a time chart illustrating the operation when all the worker nodes have completed the process by the synchronization determination time in the computer system according to the first embodiment.

First, referring to FIG. 4, description will be given of the operation of the parallel computer system 100 in the barrier synchronization, when all the worker nodes have completed the process by the synchronization determination time. In FIG. 4, reference numeral 400 represents a detailed time chart when all the worker nodes have completed the process by the synchronization determination time. It is shown that, in the parallel computer system 100, the master node (M) and the worker nodes (W1, W2, W3) perform processes and communications (solid lines) involved in the synchronization process in chronological order. In this embodiment, any number of worker nodes can be included in the parallel computer system 100. Here, the number of worker nodes is assumed to be three to simplify the description.

First, in FIG. 4, when the parallel process program is executed, the master node obtains the basic process time T and the correction process time $\Delta T$ from the parallel process program (time 450). The basic process time T and the correction process time $\Delta T$ are major features and important parameters in this embodiment. The basic process time T and the correction process time $\Delta T$ are the parameters set by the programmer of the application. The basic process time T and the correction process time ΔT are described in the parallel process program.

Next, the master node performs a communication 402 to all the worker nodes (time 452). The communication 402 is the same as the communication of the conventional technology that transmits the program to be executed by the worker nodes, the initial value of the program, and the like, to the worker nodes. Here, the initial value is the input parameter for each worker node in the program, such as the information on the input data, and the information on the source and destination of the intermediate result data.

In response to the communication 402 received from the master node, the worker node activates the process based on the obtained information, and prepares for the start of the task process.

Next, the master node performs a communication 404 to all the worker nodes (time 454). The communication 404 is the broadcast transmission of the process start notification and the basic process time T. In this embodiment, the master node transmits the process start notification as well as a synchronization completion notification described below, together with the information on the basic process time T. The transmission of the basic process time T allows for the setting of the synchronization determination time on the worker node side. The process start notification serves as a trigger for the worker node to perform the next process.

After the communication 404, when the worker node has not complete the task process within the basic process time T, the master node calculates the time (which is defined as the master determination time) at which the process-not-completed notification is necessarily received from the worker node, and waits until the master determination time. The master determination time can be calculated from the time immediately after the communication 404, the maximum value of the delay time of the broadcast communication 404 reaching the worker node (broadcast worst delay time T_nw1), the basic process time T, and the worst value of the delay time of the process-not-completed notification reaching the master node from the worker node (master-worker node worst delay time T_nw2).

In the example of FIG. 4, it is possible to calculate the following: master determination time 1=(time 454)+T_nw1+T+T_nw2. Here, T_nw1 and T_nw2 can be obtained for both cases of broadcast communication and one-to-one communication, by calculating (maximum number of network switch hops)×(maximum delay time per network switch hop)×(maximum delay time of communication termination process on the node) in the communication between the master node and the worker node that is farthest from the master node in the network. This is the well known calculation method of the worst delay time.

In response to the communication 404 received from the master node, the worker node calculates the time to report the task process state to the master node. This time is defined as the worker determination time. The worker node performs the task process until the worker determination time. Here, the worker determination time can be calculated from the time immediately after the reception of the communication 404 as well as the basic process time T. For example, if a certain worker node receives the communication 404 at the worst delay time, it is possible to calculate in the particular worker node as follows: worker determination time 1=(time 456)+T. Here, the worker determination time 1 slightly varies in each worker node, but this is not a significant problem. Because, the worker determination time 1 in all the worker nodes satisfies the condition of (worker determination time 1+T_nw2≤master determination time 1). In other words, the master node will surely receive the process-not-completed notification from the worker node by the master determination time 1.

When the time reaches the worker determination time 1, the worker node notifies the master node of the state of the task process. Here, in this embodiment, the worker node transmits the process-not-completed notification to the master node only when the task process is not completed. However, if the task process is completed, the worker node waits for the synchronization completion notification from the master node. In other words, in the example of FIG. 4, all the worker nodes do not transmit any notification to the master node, and wait for the synchronization completion notification.

When the time reaches the master determination time 1, the master node checks whether the process-not-completed notification is received from worker node. In this embodiment, when the master node does not receive the process-not-completed notification, it is determined that the task process is completed in all the worker nodes. On the other hand, when the master node receives one or more process-not-completed notifications, it is determined that the task process is not completed in at least one worker node. In other words, in the example of FIG. 4, the master node does not receive the process-not-completed notification, it is determined that the task process is completed in all the worker nodes.

Here, the mechanism of the worker node notification at the worker determination time 1 and the mechanism of the master node determination at the master determination time 1 are the main feature of the barrier synchronization according to this embodiment. This feature allows the synchronization overhead to be independent of the number of nodes. Because, if it is assured that the notification comes by a predetermined time, obtaining all the process completion notifications and obtaining no process-not-completed notification at the process time are equivalent.

When it is determined that the task process has been completed in all the worker nodes, the master node updates the basic process time T and the correction process time ΔT. Various algorithms can be used to update the basic process time T and the correction process time ΔT. For example, if once the process-not-completed notification is received in a particular task process zone, the value is updated by adding the correction process time ΔT to the basic process time T, where the correction process time ΔT is assumed to be fixed.

Then, the master node performs a communication 406 to all the worker nodes (time 458). The communication 406 is the broadcast transmission of the synchronization completion notification and the basic process time T. The synchronization completion notification serves as a trigger for the worker node to perform the next process. The basic process time T is necessary for calculating the worker determination time for the next task process. Then, the master node calculates a master determination time 2 and waits until this time. Further, in response to the communication 406 received from the master node, the worker node calculates a worker determination time 2 and performs the task process until this time.

As described above, this is the operation of the parallel computer system 100 when all the worker nodes have completed the task by the synchronization determination time in the barrier synchronization according to the first embodiment.

Description of (b)

Figure 5:
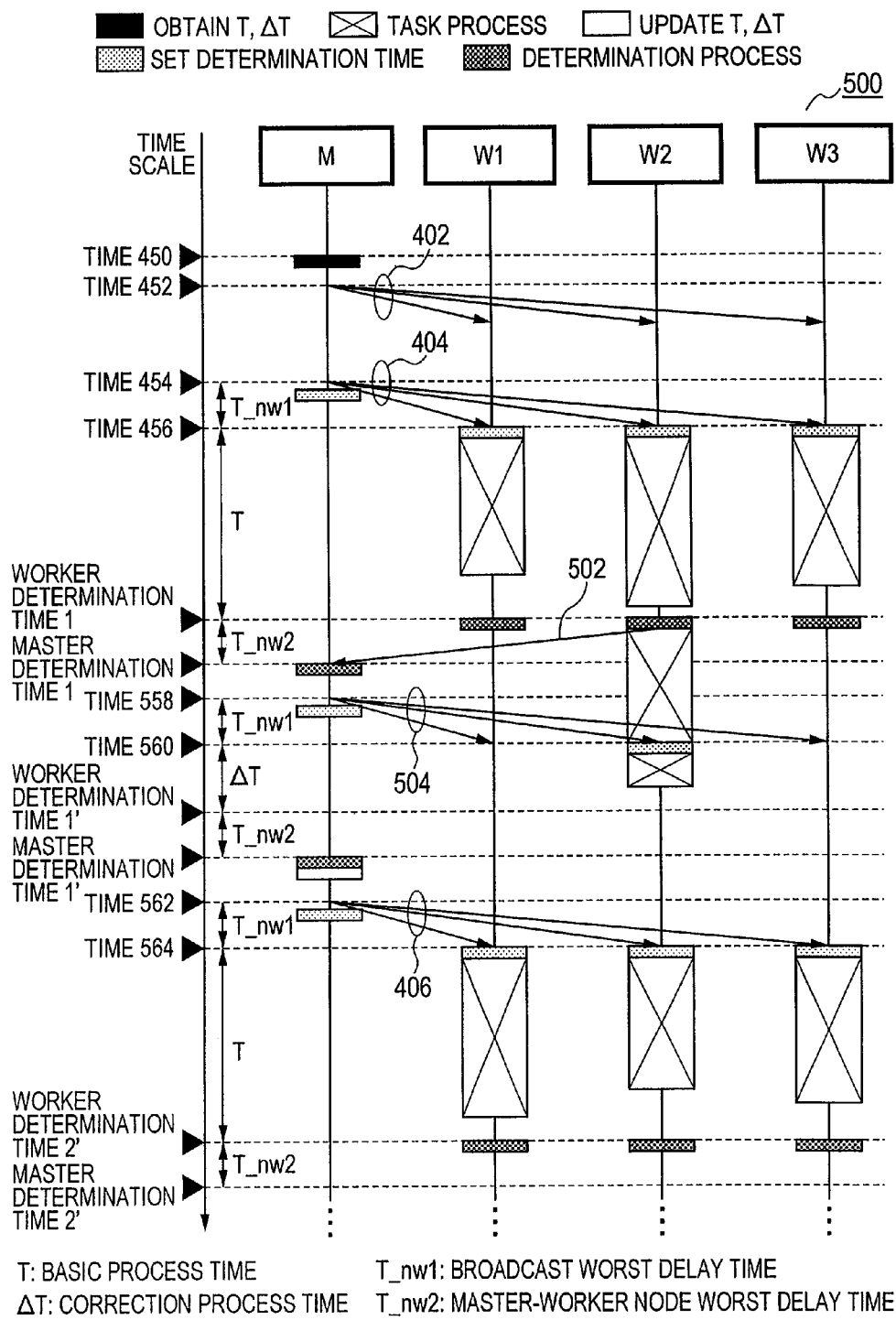
FIG. 5 is a time chart illustrating the operation when a certain worker node has not completed the process by the synchronization determination time in the computer system according to the first embodiment.

Next, referring to FIG. 5, description will be given of the operation of the parallel computer system 100 in the barrier synchronization, when a certain worker node has not completed the task by the synchronization determination time. Reference numeral 500 of FIG. 5 represents a time chart showing the operation of the parallel computer system 100 when a certain worker node has not completed the process by the synchronization determination time. FIG. 5 is similar to FIG. 4, and the same components as those of FIG. 4 are denoted by the same reference numerals.

In FIG. 5, the operation until the worker determination time 1 is the same as the operation of the entire system when all the worker nodes have completed the process by the synchronization determination time as shown in FIG. 4. Thus, the description thereof will be omitted. Hereinafter, the operation from the worker determination time 1 will be described.

When the time reaches the worker determination time 1, the worker node notifies the master node of the state of the task process. In the example of FIG. 5, the task process of the worker node 2 (W2) is not completed, so that only the worker node 2 transmits a process-not-completed notification (communication 502) to the master node. When the transmission is completed, the worker node restarts the incomplete task process.

When the time reaches the master determination time 1, the master node checks whether the process-not-completed notification is received from worker node. In the time chart 500 of FIG. 5, the master node receives the process-not-completed notification, so that it is determined that there is a worker node that has not completed the task process. Then, the master node performs a communication 504 to all the worker nodes (time 558). The communication 504 is the broadcast transmission of a process extension notification and the correction process time $\Delta T$. Due to the process extension notification, the worker node can recognize that the task process time is extended. The correction process time $\Delta T$ is necessary for the worker node to correct the worker determination time.

Then, the master node calculates a master determination time 1' which is the extended master determination time, and waits until this time. The master determination time 1' can be calculated as the sum of the broadcast worst delay time $T\_nw1$, the correction process time $\Delta T$, and the master-worker node worst delay time $T\_nw2$. In other words, it can be given as follows: the master determination time 1'=(time 558)+$T\_nw1$+$\Delta T$+$T\_nw2$.

In response to the communication 504 received from the master node, the worker node calculates a worker determination time 1' which is the extended worker determination time, and performs the task process until this time. The worker determination time 1' can be calculated from the time immediately after the reception of the communication 504, and the correction process time $\Delta T$. For example, in the worker node receiving the communication 504 at the worst delay time, it can be given as follows: the worker determination time 1'=(time 560)+$\Delta T$. Similarly to the worker determination time 1, the worker determination time 1' varies in each worker node, but this is not a significant problem.

Here, the mechanism for correcting the worker determination time 1 to the worker determination time 1', and the mechanism for correcting the master determination time 1 to the master determination time 1' are the main feature of the synchronization method according to the first embodiment. This feature allows the synchronization overhead to be greatly reduced compared to the conventional technology for setting the synchronization interval based on the assumption of the worst-case process time.

When the time reaches the worker determination time 1', the worker node notifies the master node of the state of the task process. Here, all the worker nodes have completed the task process, so that the process-not-completed notification is not transmitted to the master node. Thus, at the master determination time 1', the master node determines that all the worker nodes have completed the task process. Then, the master node updates the basic process time T and the correction process time $\Delta T$, and performs the communication 406 to all the worker nodes (time 562). The communication 406 is the broadcast transmission of the synchronization completion notification and the basic process time T. After the communication 406, the master node calculates a master determination time 2', and waits until this time. Further, in response to the communication 406 received from the master node, the worker node calculates a worker determination time 2' and performs the task process until this time.

This is the operation of the parallel computer system 100 when a certain worker node has not completed the process by the synchronization determination time, in the barrier synchronization according to the first embodiment.

The above description has focused on the operation in the barrier synchronization of the parallel computer system 100 according to the first embodiment. Hereinafter, description will be given of the relationship between the process steps of the flow charts of the master node and the worker node shown in FIGS. 6 and 7, and the processes at each time shown in FIGS. 4 and 5. Further, description will be given of the operations of both the master node and the worker node to realize the barrier synchronization according to the first embodiment.

Figure 6:
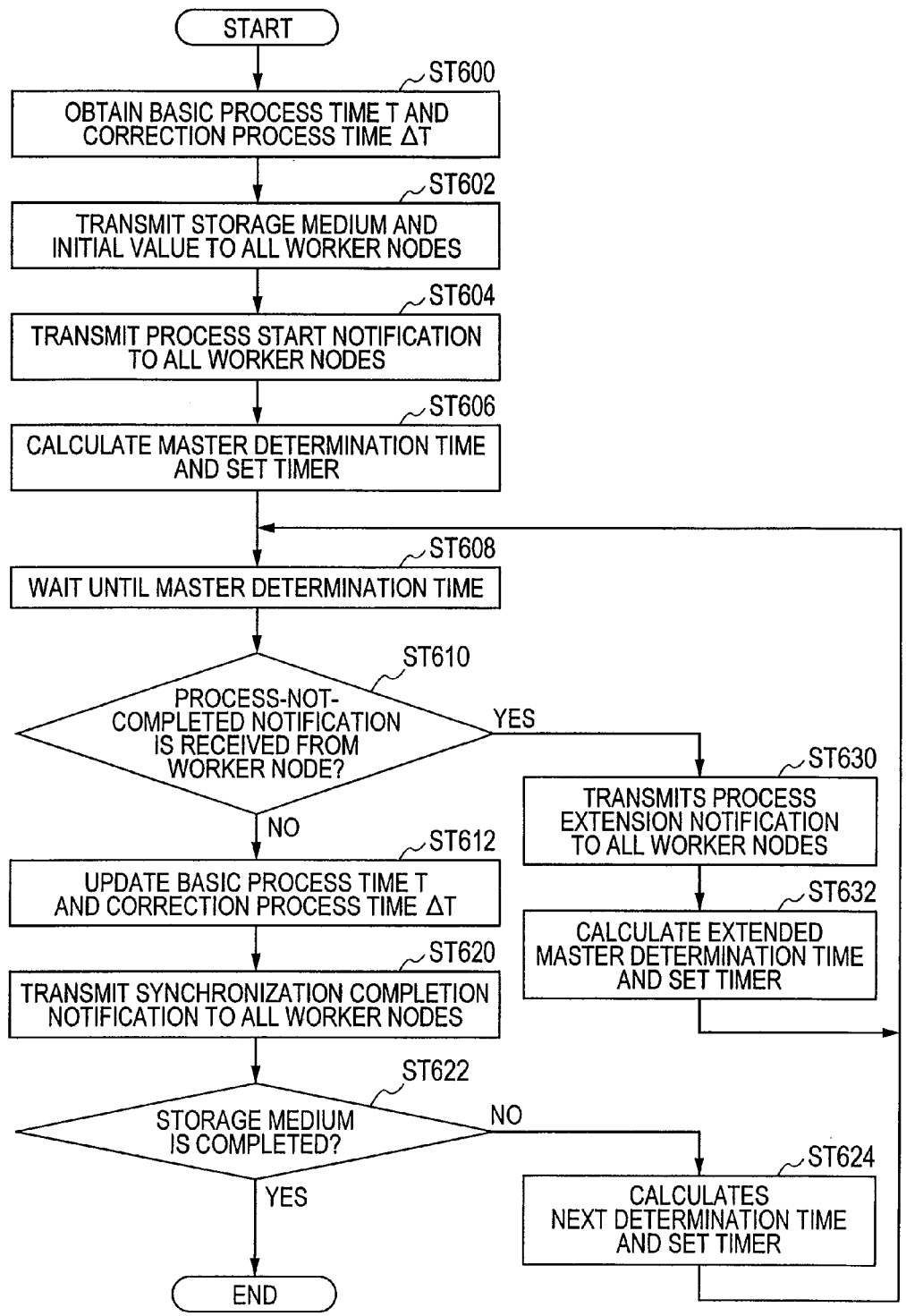
FIG. 6 is a flow chart showing the master node according to the first embodiment.

First, the operation of the master node according to the first embodiment will be described with reference to FIG. 6.

When the parallel process program is executed, as step ST600, the master node first obtains the basic process time T and the correction process time $\Delta T$. This corresponds to the operation of the time 450. Next, as step ST602, the master node transmits the program to be executed by all the worker nodes and the initial value of the program, to all the worker nodes. This corresponds to the operation of the time 452. Next, as step ST604, the master node transmits the process start notification to all the worker nodes. At this time, the master node also transmits the information on the basic process time T. Then, as step ST606, the master node calculates the master determination time, and sets a timer. This corresponds to the operation of the time 454. Next, as step ST608, the master node waits until the master determination time. Then, as step ST610, the master node checks whether the process-not-completed notification is received from worker node. This corresponds to the operation of the master determination time 1.

Here, if the process-not-completed notification is not received from any of the worker nodes, the master node updates the basic process time T and the correction process time $\Delta T$ as step 612. Then, as step ST620, the master node transmits the synchronization completion notification to all the worker nodes. At this time, the master node also transmits the information on the basic process time T. Then, as step ST622, the master node determines whether all the steps in the program are completed. When all the steps are completed, the process ends. If not, the master node sets the master determination time of the next task process as step ST624. Then, the process returns to step ST608.

This corresponds to the operation of the time 458 in FIG. 4 and the time 562 in FIG. 5. On the other hand, when the process-not-completed notification is received from a certain worker node in step ST610, the master node transmits the process extension notification to all the worker nodes as step ST630. At this time, the master node also transmits the information on the correction process time $\Delta T$. Then, as step ST632, the master node calculates the extended master determination time and sets the timer. Then, the process returns to step ST608. This corresponds to the operation of the time 558.

Next, the operation of the worker node according to the first embodiment will be described with reference to FIG. 7.

First, as step ST702, the worker node obtains the program to be executed by the worker node, as well as the initial value of the program from the master node. This corresponds to the operation of the time 452. Next, as step ST704, the worker node waits until the process start notification is received from the master node. In response to the process start notification received from the master node, as step ST706, the worker node calculates the worker determination time by using the information on the basic process time T that is transmitted along with the process start notification, and sets the timer. This corresponds to the operation of the time 456. Next, as step ST708, the worker node performs the task process until the worker determination time. Then, as step ST710, the worker node checks whether the task process is completed. This corresponds to the operation of the worker determination time 1.

Here, when the task process has been completed, as step ST720, the worker node waits until the synchronization completion notification is received from the master node. When the worker node receives the synchronization completion notification from the master node, the process moves to step ST726. Then, the worker node determines whether all the steps in the program are completed. when all the steps are completed, the process ends. If not, as step ST728, the worker node sets the worker determination time of the next task process by using the information on the basic process time T that is transmitted along with the synchronization completion notification. Then, process returns to step ST708. This corresponds to the operation of the time 460 in FIG. 4 and the operation of the time 564 shown in FIG. 5.

On the other hand, when the task process is not completed in step ST710, the process moves to step ST730 in which the worker node transmits the process-not-completed notification to the master node. Then, as step ST732, the worker node restarts the incomplete task process. This corresponds to the operation of the worker determination time 1. As step ST734, the worker node receives the process extension notification from the master node. Then, the process moves to step ST736. The worker node calculates the extended worker determination time by using the information on the correction process time ΔT that is transmitted along with the process extension notification, and sets the timer. Then, the process returns to step ST708. This corresponds to the operation of the time 560.

This is the operations of the master and worker node according to the first embodiment. In this way, it is possible to address the problem of the conventional technology and to perform parallel computation with a small synchronization overhead for the application with a relatively large variation of the process time.

In the above description, the barrier synchronization according to the first embodiment has been described. Hereinafter, the specific configuration of the method for realizing the barrier synchronization on the computing units 110 of FIG. 1 will be described with reference to FIGS. 8A and 8B.

Figure 8A:
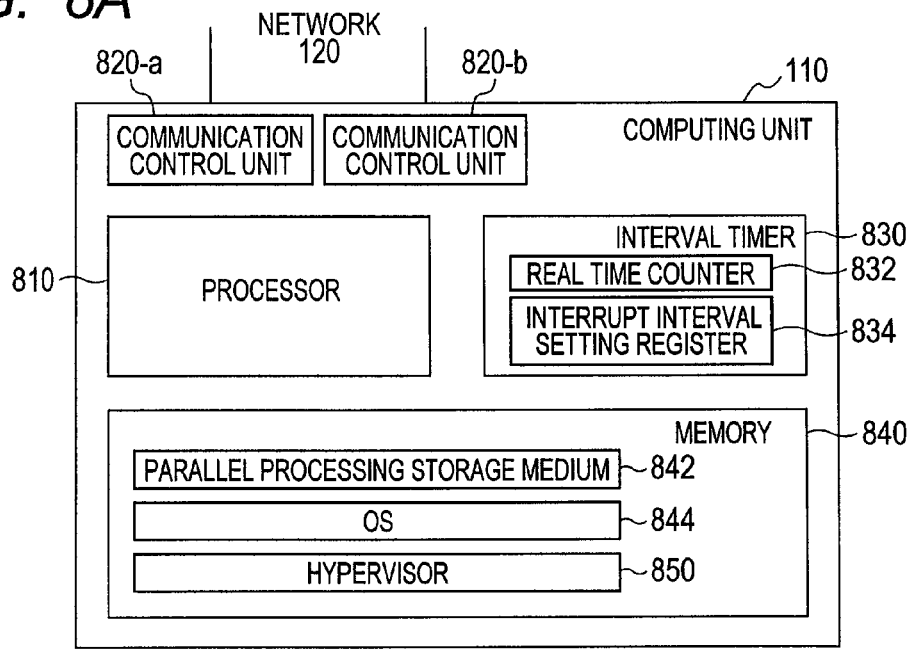
FIG. 8A is a block diagram of a computing unit according to the first embodiment.

FIG. 8A is a block diagram of the computing unit 110 according to the first embodiment. The computing unit 110 includes a processor 810 that functions as the processing unit interconnected by an internal bus and the like (not shown), communication control units 820-a and 820-b, an interval timer 830, and a memory 840 which is a storage unit. The processor 810 is the device for executing various programs stored in the memory 840. The processor 810 is also called the central processing unit (CPU).

The communication control units 820-a, 820-b are the units each serving as an interface between the network 120 and the computing unit 110. The communication control units 820-a, 820-b provide the functions such as one-to-one communication with another unit, and broadcast communication. When data is received from the network 120, the communication control units 820-a, 820-b write the received data into the memory 840, and transmit an interrupt notification (called a communication interrupt) indicating that there is a communication to the processor 810. In response to the communication interrupt, the processor 810 stops the current process to execute the communication interrupt process. When the communication interrupt process is completed, the processor 810 restarts the interrupted process. The computing unit 110 in this embodiment includes the two communication control units 820-a, 820-b. In this embodiment, one of the two communication control units 820-a, 820-b is used as a dedicated device to perform communications relating to synchronization, such as the communications 404, 406, 502, 504 shown in FIGS. 4 and 5. The reason will be described below. Here, in the following description, it is assumed that the communication control unit 820-a is selected as the dedicated device to perform the communications relating to synchronization.

The interval timer 830 has a real time counter 832 that is synchronized with an internal or external clock and counts up. The real time counter 832 can be read from the processor 810. Further, the interval timer 830 also has an interrupt interval setting register 834, and can set a timer interrupt time interval by using the interrupt interval setting register 834. When the time set in the interrupt interval setting register 834 has passed, the interval timer 830 generates a timer interrupt to the processor 810. In response to the timer interrupt, the processor 810 stops the current process to execute the timer interrupt process. Then, when the timer interrupt process is completed, the processor 810 restarts the interrupted process. In the timer interrupt process, the interrupt interval setting register 834 is reset to allow the timer interrupt to be generated again.

The memory 840 includes a parallel process program 842, an operating system (hereinafter, referred to as OS) 844, and a Hypervisor 850. The parallel process program 842 is the program that is generated by the programmer of the application. The OS 844 is the program for performing the interrupt process as well as the control of the devices such as the communication control units 820. The OS 844 is an existing OS such as Windows (registered trademark) or Linux.

The purpose of the Hypervisor 850 is to virtualize the hardware or hide a portion of the function from the OS 844. In this embodiment, in particular, the Hypervisor 850 hides the interrupt process, the barrier synchronization, and the distributed parallel process from the OS 844. In other words, the Hypervisor 850 only performs the additional process necessary for achieving the barrier synchronization according to this embodiment. The other interrupt process is performed by the OS 844 as in the past.

Figure 8B:
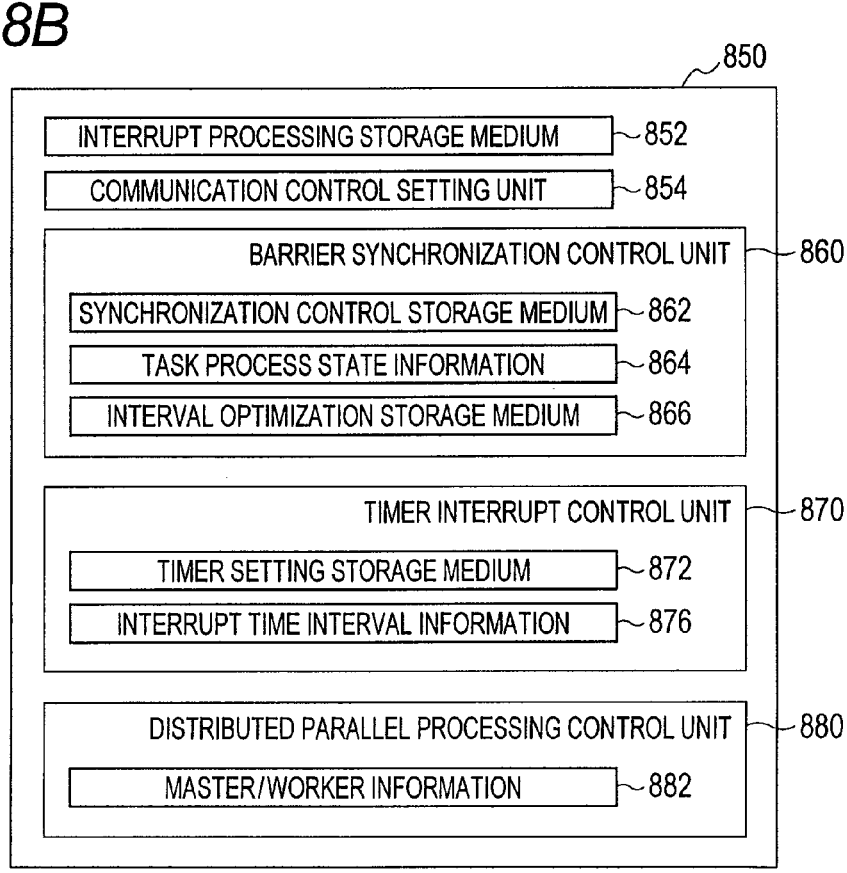
FIG. 8B is a block diagram of a computing unit according to the first embodiment.

Thus, as shown in FIG. 8B, the Hypervisor 850 according to this embodiment includes an interrupt processing program 852, a distributed parallel processing control unit 880, a communication control setting unit 854, a barrier synchronization control unit 860, and a timer interrupt control unit 870.

As shown in FIG. 8B, the interrupt processing program 852 executes the process of the interrupt received from the interval timer 830 and the communication control unit 820, as well as the process of the system call required for this embodiment such as the setting of the basic process time T in the parallel process program 842, and the writing of process completion flag information 902 described below. The hypervisor 852 asks the OS 844 to perform other interrupt processes.

The communication control setting unit 854 shown in FIG. 8B sets the communication control unit 820. The communication control setting unit 854 according to this embodiment has a feature that the value set to the communication control unit 820 is changed according to the value of the master/worker information 882.

The barrier synchronization control unit 860 is the control unit for achieving the barrier synchronization according to this embodiment. The barrier synchronization control unit 860 includes a synchronization control program 862, task process state information 864, and an interval optimization program 866. The synchronization control program 862 is the program for achieving the barrier synchronization such as the extension determination process of the process time in the master node as described above, as well as the access to the task process state information 864.

Figure 9:
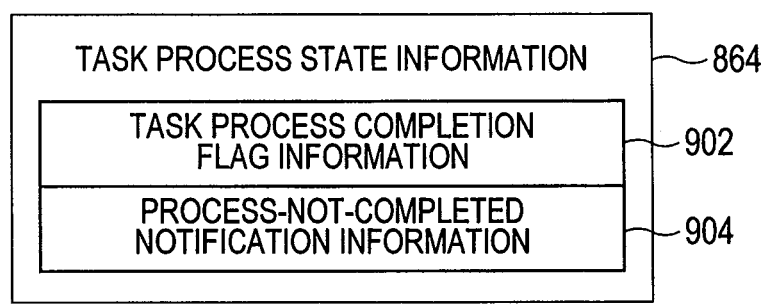
FIG. 9 is a view of the task process state information stored in a Hypervisor according to the first embodiment.

As shown in FIG. 9, the task process state information 864 is the information on the state of the task process. The task process state information 864 includes the task process completion flag information 902 and process-not-completed notification information 904. The task process completion flag information 902 is the flag indicating whether the worker node has completed the task process. At the time when the worker node completes the task process, the flag is set through the synchronization control program 862. The process-not-completed notification information 904 is the information indicating whether the process-not-completed notification is received from the worker node. When the process-not-completed notification is received from the worker node, the process-not-completed notification is written into the memory area of the process-not-completed information 904 by the communication control unit 820-$a$. The interval optimization program 866 is the program for updating the basic process time T and the correction process time $\Delta T$, which are stored in the interrupt time interval information 876, to the appropriate values to further reduce the synchronization overhead, respectively.

In FIG. 8B, the timer interrupt control unit 870 is the control unit for setting the timer interrupt interval of the interval timer 830. The timer interrupt control unit 870 includes timer setting program 872 and interrupt time interval information 876. The timer setting program 872 is the program that causes the interval timer 830 to generate a timer interrupt at the master determination time or at the worker determination time by using the interrupt time interval information 876.

Figure 10:
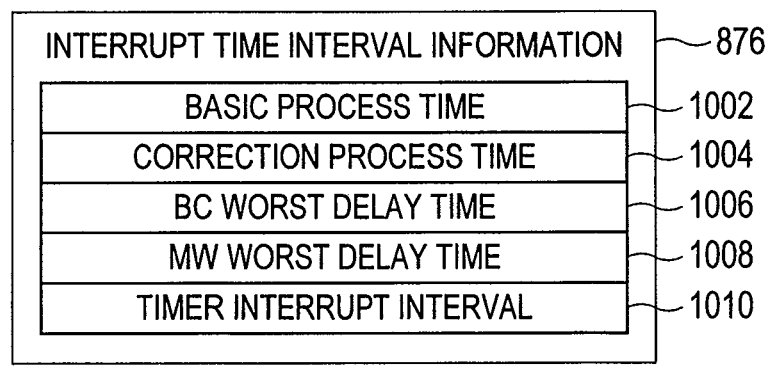
FIG. 10 is a view of the interrupt interval information stored in the Hypervisor according to the first embodiment.

As shown in FIG. 10, the interrupt time interval information 876 includes the information on the calculation of the master determination time and the worker determination time. More specifically, the interrupt time interval information 876 includes a basic process time 1002 which is the information on the basic process time T, a correction process time 1004 which is the information on the correction process time $\Delta T$, a BC worst delay time 1006 which is the information on the broadcast worst delay time T_nw1, a MW worst delay time 1008 which is the information on the master-worker node worst delay time T_nw2, and a timer interrupt interval 1010.

The distributed parallel processing control unit 880 shown in FIG. 8B is the base to provide the basic functions of a general distributed parallel process using plural nodes. The distributed parallel processing control unit 880 includes master/worker information 882. The master/worker information 882 is the identification information indicating whether a particular computing unit is master node or worker node.

This is an example of the configuration of the computing unit 110 according to this embodiment. The following is the detailed description of the method for realizing the operations of the master and worker nodes shown in FIGS. 6 and 7 using the computing units 110.

First, the method for realizing the operation of the master node will be described. In order to realize the operation of the master node shown in FIG. 6, it is enough to realize the following six methods which are a feature of this embodiment. Here, numbers in parentheses represent the corresponding steps in the operation of the master node shown in FIG. 6.

(M-1) Method for obtaining the basic process time T and the correction process time $\Delta T$ (ST600)
(M-2) Method for identifying master or worker (ST602)
(M-3) Method for notifying the process start, synchronization completion, and process extension (ST604, ST620, ST630)
(M-4) Method for obtaining a timer interrupt at the master determination time (ST606, ST608, ST624, and ST632)
(M-5) Method for determining the completion of the process in all the worker nodes (ST610)
(M-6) Method for updating the basic process time T and the correction process time $\Delta T$ (ST612)

Hereinafter, the methods (M-1) to (M-6) will be described.
Realization Method of (M-1)

In order to obtain the basic process time T and the correction process time $\Delta T$, it is necessary to prepare an application program interface (API) that is set to the basic process time 1002 and the correction process time 1004 in the interrupt time interval information 876. Then, the application program interface is presented to the programmer of the application to obtain the basic process time T and the correction process time $\Delta T$ from the parallel process program 842 upon execution. If the basic process time T and the correction process time $\Delta T$ are not obtained from the parallel process program 842, it is possible to use the default values of the basic process time 1002 and the correction process time 1004.

Realization Method of (M-2)

In this embodiment, the operation of the master node and the operation of the worker node are different. Thus, it is necessary to recognize in advance whether the computing unit 110 is the master node or the worker node. In this embodiment, it is possible to identify that the computing unit 110 is the master node in step ST602 based on the program of the distributed parallel processing control unit 880. At this time, the identification information is written into the master/worker information 882. This makes it possible to identify the computing unit 110 as the master node by referring to the identification information.

Realization method of (M-3)

The master node according to this embodiment performs three broadcast communications: process start notification, synchronization completion notification, and process extension notification. At this time, an identification code is assigned to each of the three types of notifications (process start, synchronization completion, and process extension), which is transmitted as data. Thus, each notification can be identified on the reception side. Transmission is done as follows. Broadcast transmission is requested to the communication control unit 820-$a$ by using the basic function of the OS 844. Then, the communication control unit 820-$a$ performs the transmission in response to the request. Here, when the process start notification or the synchronization completion notification is transmitted, the information on the basic process time T is also transmitted together with the identification code. Further, when the process extension notification is transmitted, the correction process time ΔT is also transmitted together with the identification code.

Realization Method of (M-4)

The master node has two types of timer interrupt intervals. One is the master determination time (ST606, ST624) based on the basic process time T. The other is the master determination time (ST632) based on the correction process time ΔT.

In order to obtain the former timer interrupt interval, the timer setting program 872 refers to the interrupt time interval information 876, and calculate as follows: Timer interrupt interval 1010=(T+T_nw1+T_nw2). Similarly, in order to obtain the latter timer interrupt, the timer setting program 872 refers to the interrupt time interval information 876, and calculates as follows: Timer interrupt interval 1010=(ΔT+T_nw1+T_nw2). It is possible to schedule a timer interrupt at the master determination time, by setting the timer interrupt interval 1010 obtained as described above to the interrupt interval setting register 834 of the interval timer 830. Note that the broadcast worst delay time T_nw1 and the master-worker node worst delay time T_nw2 are the design values of the parallel computer system, so that T_nw1 and T_nw2 are set to the BC worst delay time 1006 and the MW worst delay time 1008 in advance.

Realization Method of (M-5)

Here, description will be given of the method for obtaining the process-not-completed notification information 904, as well as the method for determining the completion of the process in all the worker nodes based on the obtained information.

First, the method for obtaining the process-not-completed notification information 904 will be described. The process-not-completed notification information 904 is the process-not-completed notification transmitted from the worker node in which the process is not completed at the worker determination time. The hypervisor 850 according to this embodiment activates the communication control setting unit 854 when it recognizes itself as the master node in step ST602 as described in (1) in order to efficiently obtain the information through the communication control unit 820-*a*. Then, the communication control setting unit 854 makes the following settings for the communication control unit 820-*a*.

(M-5-1) The interrupt notification (communication interrupt) is not transmitted to the processor 810 even if the data is received from the outside.

(M-5-2) The destination to which the received data is to be written is defined as the address area of the process-not-completed notification information 904.

The purpose of (M-5-1) is to reduce the process time overhead associated with the collection of the process-not-completed notification. The process-not-completed notification is transmitted from the worker node that has not completed the process at the worker determination time. In the worst case, the process-not-completed notification may be transmitted from all the worker nodes. In such a case, if the communication control unit 820-*a* transmits the interrupt notification for the number of received process-not-completed notifications, the processor 810 should perform the communication interrupt process for a very large number of times, requiring a considerable amount of process time depending on the number of worker nodes. This leads to the delay in the transmission of the process extension notification from the master node, resulting in a large process time overhead. Thus, (M-5-1) is set to avoid the large process time overhead.

Here, the setting of (M-5-1) allows the processor 810 not to detect the reception of data from the outside, which is generally a problem. However, in this embodiment, the master node has two features. One is that the received data on synchronization is only the process-not-completed notification from the worker node. The other is that if there is the process-not-completed notification, it is received at least by the master determination time. Thus, in the master node according to this embodiment, there is no problem in receiving the process-not-completed notification even with the setting of (M-5-1). Further, the communication control unit 820-*a* is used as the dedicated interface to perform the communication on synchronization, while the communication control unit 820-*b* is used as the interface for other communications. In this way, other communications can be performed without any problem.

Further, in this embodiment, one-way communication is preferably used for the transmission of the process-not-completed notification (communication 502) from the worker node to the master node. Because the one-way communication has a feature of not retransmitting the data, ensuring that the process-not-completed notification does not reach the master node after the master determination time. For example, it is assumed that a large number of process-not-completed notifications are generated and a packet loss occurs on the network 120 or the computing unit 110. In this case, if the worker node retransmits the process-not-completed notification, and if the process-not-completed notification reaches the master node after the process extension notification after the master determination time has passed, it is necessary for the master node to determine whether the received process-not-completed notification is based on the previous process complete determination or on the present process complete determination. This makes the determination process of the master node complicated and is not desirable. Further, in this embodiment, the master node does not necessarily receive all the process-not-completed notifications transmitted from the worker nodes, but it is enough to receive one or more notifications. Due to the above reasons, the use of the one-way communication is preferred in this embodiment. Examples of the one-way communication include user datagram protocol (UDP) and remote direct memory access (RDMA).

The purpose of (M-5-2) is to reduce the used memory area. When the number of worker nodes is enormous, a very large memory area is required to receive all the process-not-completed notifications. However, in the synchronization method according to this embodiment, it is enough to know that the master node has received at least one process-not-completed notification by the master determination time. For this reason, the necessary memory area is only the area where one process-not-completed notification data can be stored. Thus, setting (M-5-2) can significantly reduce the size of the used memory area.

As described above, the master node of the computing unit 110 according to this embodiment can efficiently obtain the process-not-completed notification information 904 through the communication control unit 820-*a*.

Next described is the method for performing process complete determination for all the worker nodes based on the process-not-completed notification information 904. In the computing unit 10 according to this embodiment, the synchronization control program 862 performs the process complete determination for all the worker nodes. This includes reset process and determination process.

First, as reset operation, the synchronization control program 862 performs the operation of clearing the process-not-completed notification information 904 immediately before the communications 404, 504, and 406. The purpose of this is to initialize the process-not-completed notification information 904, or to delete the process-not-completed notification information 904 that is referred to in the previous step ST610. In this way, it is possible to properly perform the process complete determination for all the worker nodes in the next step ST610.

The next determination process is started at the master determination time. First, when the time reaches the master determination time, the processor 810 receives a timer interrupt from the interval timer 830, and executes the synchronization control program 862. The synchronization control program 862 refers to the process-not-completed notification information 904 in the task process state information 864. If there is the data of the process-not-completed notification, it is determined that a certain worker node has not completed the task process. If there is no data of the process-not-completed notification, it is determined that all the worker nodes have completed the task process. Then, based on the above determination result, synchronization control program 862 performs the communication 504, or performs the communication 406 after the basic process time T and the correction process time ΔT are updated by calling the interval optimization program 866.

As described above, the master node of the computing unit 110 according to this embodiment can perform the process complete determination for all the worker nodes.

Realization Method of (M-6)

Finally, the method for updating the basic process time T and the correction process time ΔT will be described. The interval optimization program 866 updates the basic process time T and the correction process time ΔT. In step ST610, if it is determined that all the worker nodes have completed the task process, the interval optimization program 866 is called by the synchronization control program 862. Then, the basic process time 1002 and the correction process time 1004 in the interrupt time interval information 876 are updated by the values of the basic process time T and correction process time ΔT that are calculated based on a predetermined algorithm.

An example of the algorithm is as follows. The parameters used for the algorithm include the number of process time extensions N_adj in a particular task process, as well as the number of process time extension repetitions N_stg and the number of process time non-extension repetitions N_stg_n before the particular task process. The basic process time T and the correction process time ΔT are corrected based on these parameters. Here, the number of process time extensions N_adj indicates the number of times the process time is extended in the particular task process. This may affect the correction amount of the correction process time ΔT. Further, the number of process time extension repetitions N_stg indicates the number of times the process time is continuously extended in the previous task process. Further, the number of process time non-extension repetitions N_stg_n indicates the number of times the process time is not continuously extended in the previous task process. These two parameters may affect the correction amount of the basic process time T.

As shown in a table 1100 of FIG. 11, for example, there are five different task processes (task process ID numbers from 1 to 5) that are separated by synchronization point. The task processes are processed in the order of the task process ID numbers from 1 to 5. When the numbers of process time extensions N_adj in the task processes are 5, 1, 5, 0, 0, the numbers of process time extension repetitions N_stg are 1, 2, 3, 0, 0, and the numbers of process time non-extension repetitions N_stg_n are 0, 0, 0, 1, and 2, respectively.

The following is the outline of the method for updating the correction process time ΔT in the algorithm.

(M-6-1) The amount of the increase or decrease is determined by the number of process time extensions N_adj.

By appropriately setting the correction process time ΔT, it is possible to quickly follow the variation of each task process time. The number of process time extensions N_adj is an indicator to determine the adequacy of the correction process time ΔT with respect to the variation of the task process time. If the number of process time extensions N_adj is large, it can be determined that the correction process time ΔT is too small. If the number of process time extensions N_adj is "1", it can be determined that the correction process time ΔT is too large. FIG. 11 shows an example of updating the correction process time ΔT, when the condition of "not change when the number of process time extensions N_adj is "0" as it is undeterminable" is added to the determination standard described above.

The following is the outline of the method for updating the basic process time T in this algorithm.

(M-6-2) The amount of the increase or decrease is determined by the number of process time extension repetitions N_stg and by the number of process time non-extension repetitions N_ste_n.

If the number of process time extension repetitions N_stg exceeds a specified value, it is determined that the basic process time is underestimated, so that T is increased. On the other hand, if the number of process time non-extension repetitions N_stg_n exceeds a specified value, it is determined that the basic process time T is overestimated, so that T is reduced. In this way, it is possible to converge the basic process time T to the appropriate value. FIG. 11 shows an example of updating the basic process time T, in which T is increased when N_stg is 2 or more and T is reduced when N_stg_n is 2 or more.

(M-6-3) Two types of deletion methods are used: one is depending on the correction process time ΔT, and the other is not depending on the correction process time ΔT.

When the basic process time T is increased, the indicator of the target value can easily be calculated by the product of the correction process time ΔT and the number of process time extensions N_adj. However, when the basic process time T is reduced, the calculation of the indicator of the target value is difficult. Thus, in this algorithm, the correction process time ΔT is used to update the basic process time T, by focusing on the fact that value of the correction process time ΔT is controlled to reflect the scale of the variation of the process time in the task process.

However, using only this method requires a significant amount of time for the basic process time T to follow the variation of the task process time due to a sudden drastic reduction in the task process time while the correction process time ΔT is small. During this time, the synchronization overhead will increase. Thus, for this case, the basic process time T is greatly reduced without depending on the correction process time ΔT, for example, by a method of simply reducing the basic process time T to half when the number of process time non-extension repetitions N_stg_n is large. In this way, it is possible to quickly flow the variation of the task process time, even in the case of reducing the basic process time T, without an increase in the synchronization overhead.

Figure 12:
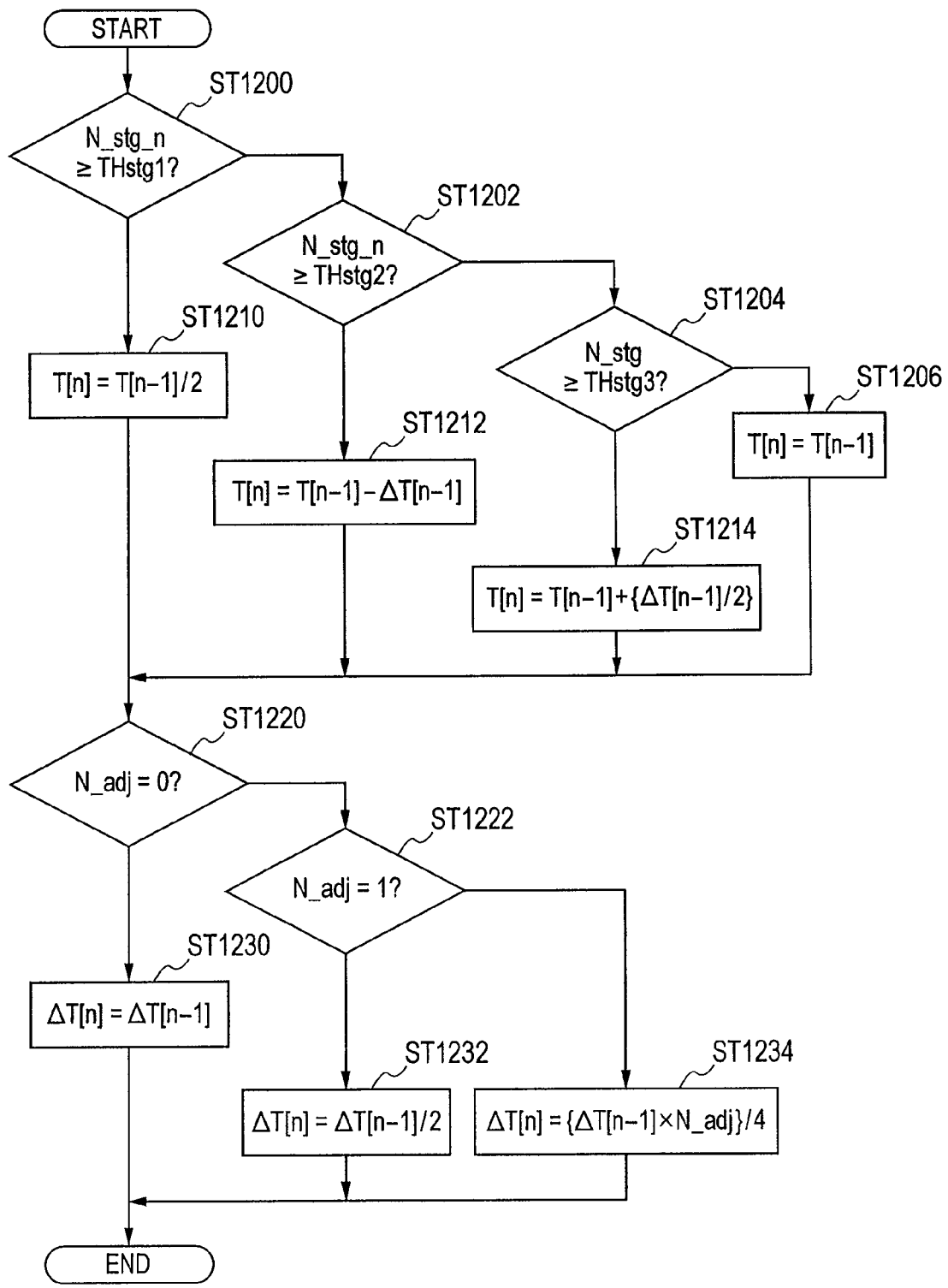
FIG. 12 is a flow chart of the algorithm according to the present invention.

FIG. 12 is a flow chart of this algorithm. Here, it is assumed that the pre-updated basic process time, or n−1st basic process time is T[n−1], and the updated basic process time, or n-th basic process time, is T[n]. The correction process time ΔT is the same as the basic process time T described above.

First, in order to update the basic process time T, as ST1200, the algorithm focuses attention on the number of process time non-extension repetitions N_stg_n, and compares it with a predetermined first threshold THstg1. If N_stg_n is greater than THstg1, the algorithm moves to ST1210 to apply the reduction method without depending on ΔT (T[n]=T[n−1]/2). If N_stg_n is smaller than THstg1, the algorithm moves to ST1202 to compare N_stg_n with a predetermined second threshold THstg2. If N_stg_n is greater than THstg2, the algorithm moves to ST112 to apply the reduction method depending on ΔT (T[n]=T[n−1]−ΔT[n−1]). If N_stg_n is smaller than THstg2, the algorithm moves to ST1204 to compare N_stg with a predetermined third threshold THstg3. If N_stg is greater than THstg3, the algorithm moves to ST1214 to apply the method of increasing T (T[n]= T[n−1]+ΔT[n−1]/2). If N_stg is smaller than THstg3, the algorithm moves to ST1216 to apply the method of not changing T (T[n]=T[n−1]). Thus, the update of the basic process time T is completed as described above.

Next, the correction process time ΔT is updated. First, as ST1220, the algorithm checks the value of the number of process time extensions N_adj. If N_adj is "0", the algorithm moves to ST1230 to apply the method of not changing ΔT (ΔT[n]=ΔT[n−1]). If N_adj is not "0", the algorithm moves to ST1222 to check whether N_adj is "1". If N_adj is "1", the algorithm moves to ST1232 to apply the method of reducing ΔT (ΔT[n]=ΔT[n−1]/2). If N_adj is not "1", the algorithm moves to ST1234 to apply the method of increasing ΔT (ΔT [n]=ΔT[n−1]×N_adj/4). Here, ΔT[n−1]×N_adj represents the total extended time in the previous task process. In this embodiment, a fourth of the total extended time is defined as ΔT[n].

In other words, the number of process time extensions N_adj is controlled to be about 4 in the task process. When the number of process time extensions N_adj is 1 or less, there is a possibility that the correction process time ΔT may be very large, leading to an increase in the synchronization overhead of the barrier synchronization according to this embodiment. However, the process time (which can be also referred to as the synchronization overhead of the barrier synchronization according to this embodiment) required for one process time extension of the task process in each worker node, is approximately the time for the counting process for one node in the general barrier synchronization. Thus, the time required for execution of several process time extensions is equivalent to several dozens of nanoseconds, which is small enough to be ignored. In other words, it is preferable that the number of process time extensions N_adj is controlled to be several time in this embodiment.

As described above, by using the update algorithm of the basic process time T and the correction process time ΔT, it is possible to set the basic process time T and the correction process time ΔT appropriately in various programs. This helps to keep the synchronization overhead small. Note that when the user specifies the basic process time T and the correction process time ΔT, it is also possible that the basic process time T and the correction process time ΔT are not necessarily updated.

As described above, the realization methods (M-1) to (M-6) allow the computing unit 110 according to this embodiment to realize the operation of the master node shown in FIG. 4.

Next, the method for realizing the operation of the worker node will be described with reference to FIG. 7.

Figure 7:
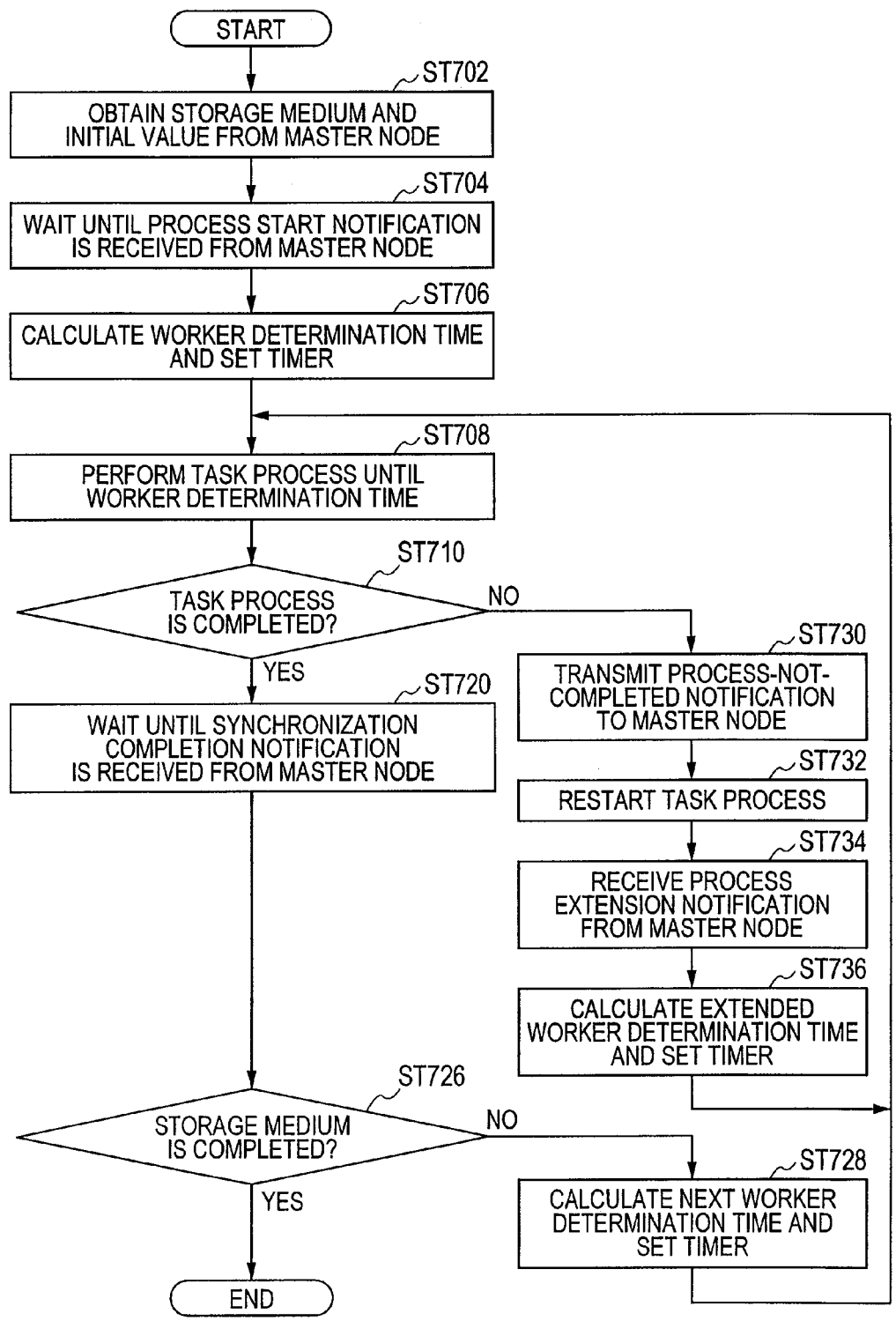
FIG. 7 is a flow chart showing the worker node according to the first embodiment.

In order to realize the operation of the worker node shown in FIG. 7, it is enough to realize the following seven methods which are a feature of this embodiment. Here, numbers in parentheses represent the corresponding steps in the operation of the worker node.

(W-1) Method for identifying master and worker (ST702)
(W-2) Method for obtaining the process start, synchronization completion, and process extension (ST704, ST720, ST734)
(W-3) Method for obtaining the timer interrupt at the worker determination time (ST706, ST728, ST736)
(W-4) Method for performing the task process (ST708)
(W-5) Method for determining the completion of the task process (ST710)
(W-6) Method for transmitting the process-not-completed notification (ST730)
(W-7) Method for restarting the task process (ST732)
The realization methods (W-1) to (W-7) will be described below.
Realization Method of (W-1)

In this embodiment, the operation of the master node and the operation of the worker node are different. Thus, it is necessary to recognize in advance whether the computing unit 110 is the master node or the worker node. In this embodiment, it is possible to identify that the computing unit 110 is the master node in step ST702 by using the program of the distributed parallel processing control unit 880. At this time, the identification information of the computing unit 110 is written into the master/worker information 882. Thus, by reference of the identification information, it is possible to identify that the computing unit 110 is the master node.
Realization Method of (W-2)

The worker node according to this embodiment receives three types of broadcast communications: process start notification, synchronization completion notification, and process extension notification. Each type of notification can be identified by the identification code transmitted as data. The reception is performed as follows. The processor 810 receives the interrupt notification from the communication control unit 820-*a*, and stops the current process. Then, the interrupt process program 852 interprets the content of the interrupt process, and asks the OS 844 to perform the interrupt process. Then, the Hypervisor 850 performs a communication interrupt process to obtain the communication data. Then, the synchronization control program 862 is started. When the communication data is the process start or synchronization completion notification, the synchronization control program 862 sets the information on the basic process time T that is transmitted along with the notification, to the basic process time 1002. Further, the synchronization control program 862 clears the flag of the task process completion flag information 902. On the other hand, if the communication data is the process extension notification, the synchronization control program 862 sets the correction process time ΔT that is transmitted along with the notification, to the correction process time 1004.
Realization Method of (W-3)

As for the worker node, there are two types of timer interrupt intervals. One is the worker determination time (ST706, ST728) based on the basic process time T. The other is the worker determination time (ST736) based on the correction process time ΔT.

In the former case, the timer setting program 872 is started after the process start notification or the synchronization completion notification is received. Then, the timer setting program 872 refers to the basic process time 1002 to obtain as timer interrupt 1010=T. In the latter case, the timer setting program 872 is started immediately after the process extension notification is received. Then, the timer setting program 872 refers to the correction process time 1004 to obtain as timer interrupt interval 1010=ΔT. Thus, it is possible to obtain the timer interrupts at the worker determination time, by setting the timer interrupt intervals 1010 obtained as described above, to the interrupt interval set register 834 of the interval timer 830.

Realization Method of (W-4)

The task process is performed by the parallel process program 842. At the time when the timer setting is completed, the timer interrupt process of the Hypervisor 850 is completed, and then the parallel process program 842 is started. The parallel process program 842 is executed until the next timer interrupt occurs. At the time when the computation reaches the synchronization point (namely, when the task process is completed), the parallel process program 842 sets the flag of the task process completion flag information 902, and waits. Note that the flag of the task process completion flag information 902 is cleared by the synchronization control program 862 that is started immediately after the start notification or the synchronization completion notification is received as described above.

Realization Method of (W-5)

The task process completion is determined by the synchronization control program 862. When the time reaches the worker determination time, the processor 810 receives the timer interrupt and stops the parallel process program 842. Then, the processor 810 executes the synchronization control program 862. The synchronization control program 862 refers to the task process completion flag information 902. When the flag is set, the synchronization control program 862 determines that the task process is completed and ends the interrupt process. On the other hand, if the flag is not set, the synchronization control program 862 determines that the task process is not completed, and transmits the process-not-completed notification to the master node.

Realization Method of (W-6)

The transmission of the process-not-completed notification is performed as follows. The synchronization control program 862 uses the basic function of the OS 844 to request the communication control unit 820-a for transmission by one-to-one communication. Then, in response to this request, the communication control unit 820-a performs the transmission. Here, preferably the communication method is one-way communication from the worker node to the master node.

Realization Method of (W-7)

The task process is restarted after the hypervisor 850 has completed the timer interrupt process. More specifically, after the synchronization control program 862 requests the communication control 820-a for the process-not-completed notification, the timer interrupt process of the Hypervisor 850 is completed. The stopped parallel process program 842 is restarted, and then the task process is restarted.

As described above, the computing unit 110 according to this embodiment can realize the operation of the worker node shown in FIG. 7 by the realization methods (W-1) to (W-7).

Note that the operations of the barrier synchronization control unit 860, the timer interrupt control unit 870, and the communication control setting unit 854 are different between the master node and the worker node. However, it is possible to perform these operations properly by referring to the master/worker information 882 in order to determine the role (master node or worker node) that the particular computing unit 110 plays.

As described above, the barrier synchronization according to this embodiment can be realized by the computing unit 110 using the Hypervisor 850 according to this embodiment and by the network 120. As a result, in the case of the execution of the application with a relatively large variation in task process time for each worker node by the parallel computer system 100 with a very large number of nodes, the synchronization overhead can be greatly reduced and a high-speed parallel process can be achieved.

Note that for the purpose of simplifying the description of this embodiment, it is assumed that the parallel computer system 100 includes homogenous computing units 110. However, the barrier synchronization according to this embodiment can be realized, if the two worst delay times (the worst delay time T_nw1 and the worst delay time T_nw2) involved in the network communication are known in advance, and if the individual computing units have two communication control units. In other words, if the computing unit 110 is combined with computing units 150, 160, and so on, which are different from the computing unit 110, but as long as all the computing units have two communication control units, it is possible to configure the parallel computer system to achieve the barrier synchronization according to this embodiment by calculating the worst delay time T_nw1 and the worst delay time T_nw2 in each computing unit in advance.

Note that the present invention is not limited to the exemplary embodiments, and may include various modifications and alternative forms. The forgoing descriptions of the specific embodiments are presented for purposes of illustration and description. They are not intended to be exhaustive or to limit the invention to the precise forms disclosed.

Further, the configurations, functions, processors, process methods, and the like may be realized, for example, by hardware such that a part or all of them are designed in an integrated circuit, or by software such that the process interprets and executes program instructions for realizing each function. The information on the program, table, file, and the like, for realizing each function may be stored in a storage device such as a memory, hard disk, or solid state drive (SSD), or in a recording medium such as an IC card, SD card, or DVD. It goes without saying that it is also possible to download the information through the network, and the like, if necessary.

The present invention is particularly useful as a parallel computer system for performing the computation process that repeats parallel process and synchronization process using master and worker nodes, and is also useful as a barrier synchronization program for the parallel computer system.

The invention claimed is:

1. A parallel computer system for performing parallel computation, the system comprising:
a plurality of computing units connected via a network, the computing units serve as a master node performing synchronization processes or as a worker node performing task processes, and one computing unit is designated as the master node and the other plurality of computing units are designated as the worker nodes,
wherein the master node:
sets a master determination time, before which the task processes in all the worker nodes are expected to be completed within a basic process time of each task process;
transmits a process start notification to the plurality of worker nodes;
checks whether a process-not-completed notification is received from any of the worker nodes at the master determination time;
if the process-not-completed notification is received, the master node transmits a process extension notification to the plurality of worker nodes regardless of whether the worker nodes have completed processing of the process tasks; and if the process-not-completed notification is not received, the master node transmits a synchronization completion notification to the plurality of worker nodes;

wherein the worker nodes each:
set a worker determination time using the basic process time when the process start notification is received from the master node;
if the task process is not completed at the worker determination time, the worker node transmits the process-not-complete notification to the master node; and
if the task process is completed at the worker determination time, the worker node not sending the process-not-complete-notification and waits for the synchronization completion notification from the master node.

2. The parallel computer system according to claim 1,
wherein if the task process in at least one of the worker nodes has not been completed by the basic process time, the master node redefines the master determination time using a correction process time,
wherein if the process extension notification is received from the master node, the worker node redefines the worker determination time using the correction process time.

3. The parallel computer system according to claim 2,
wherein the master node transmits the synchronization completion notification or the process start notification, together with information of the basic process time,
wherein the master node transmits the process extension notification together with information of the correction process time.

4. The parallel computer system according to claim 2,
wherein the master node updates a value of the basic process time or correction process time using a predetermined calculation method.

5. The parallel computer system according to claim 1,
wherein each of the plurality of computing units comprise a plurality of communication control units, a processor, and a storage unit, the plurality of communication control units are connected to the processor, the storage unit, and the network.

6. The parallel computer system according to claim 5,
wherein one of the communication control units is used for transmitting and receiving the process start notification, the process-not-completed notification, the process extension notification, and the synchronization completion notification between the master node and the worker node.

7. The parallel computer system according to claim 5,
wherein the storage unit of the computing unit includes a memory area for storing master/worker information to identify whether the particular computing unit is the master node or the worker node.

8. The parallel computer system according to claim 7,
wherein the computing unit receives a program to be executed by the worker node from the computing unit serving as the master node, and stores the master/worker information in the memory area.

9. A program stored in a non-transitory computer readable medium and executed by a processor of a plurality of computing units connected via a network, the plurality of computing units are part of a parallel computer system for performing parallel computation the computing units each comprise the processor and the non-transitory computer readable medium, the computing units serve as a master node performing synchronization processes or as a worker node performing task processes, and one computing unit is designated as the master node and the other of the plurality of computing units are designated as the working nodes, wherein the program causes the processor of the computing unit serving as the master node to perform the steps of:
setting a master determination time, before which the task processes in all the worker nodes are expected to be completed within a basic process time of each task process;
transmitting a process start notification to the plurality of worker nodes;
checking whether a process-not-completed notification is received from any of the worker nodes at the master determination time,
when the process-not-completed notification is received, transmitting a process extension notification to the plurality of worker nodes regardless of whether the worker nodes have completed processing of the process tasks; and
when the process-not-completed notification is not received, transmitting a synchronization completion notification to the plurality of worker nodes, wherein the program causes a computing unit serving as a worker node to perform the steps of:
setting a worker determination time by using the basic process time when the process start notification is received from the master node;
when the task process is not completed at the worker determination time, transmitting the process-not-completed notification to the master node; and
when the task process is completed at the worker determination time, not sending the process-not-completed notification and waiting for the synchronization completion notification from the master node.

10. The program according to claim 9,
wherein when the task process in at least one of the worker nodes has not been completed by the basic process time, the program causes the processor of the computing unit serving as the master node to redefine the master determination time by using a correction process time,
wherein when the process extension notification is received from the master node, the program causes the processor of the computing unit serving as the worker node to redefine the worker determination time by using the correction process time.

11. The program according to claim 10,
wherein the program causes the processor of the computing unit serving as the master node to perform the steps of:
transmitting the synchronization completion notification or the process start notification, together with information of the basic process time; and
transmitting the process extension notification together with information of the correction process time.

12. The program according to claim 10,
wherein the program causes the processor of the computing unit serving as the master node to update a value of the basic process time or correction process time by a predetermined calculation method.

13. The program according to claim 9,
wherein the program causes the processor of the computing unit to store master/worker information in the non-transitory computer readable medium to identify whether the particular computing unit is the master node or the worker node.

14. The program according to claim 13,
wherein the program causes the processor of the computing unit serving as the master node to transmit a program to be executed by the worker node and an initial value of the program, to the computing unit serving as the worker node.

15. The program according to claim 14,
wherein when the program and the initial value of the program are received, the program causes the processor of the computing unit serving as the worker node to store the master/worker information indicating the worker node into the non-transitory computer readable medium.

16. A method for controlling a parallel computer system for performing parallel computation by connecting a plurality of computing units via a network, the computing units serve as a master node for performing synchronization processes or as a worker node for performing task processes, and one computing unit is designated as the master node while the other of the plurality of computing units are designated as the worker nodes, the method comprising the steps of:

- setting, by the master node, a master determination time before which the task processes in all the worker nodes are expected to be completed within a basic process time of each task process;
- transmitting, by the master node, a process start notification to the plurality of worker nodes;
- checking, by the master node, whether a process-not-completed notification is received from any of the worker nodes at the master determination time,
  - when the process-not-completed notification is received, transmitting, by the master node, a process extension notification to the plurality of worker nodes regardless of whether the worker nodes have completed processing of the process tasks;
  - when the process-not-completed notification is not received, transmitting, by the master node, a synchronization completion notification to the plurality of worker nodes;
- setting, by each worker node, a worker determination time by using the basic process time when the process start notification is received from the master node;
  - when the task process is not completed at the worker determination time, transmitting, by each worker node, the process-not-completed notification to the master node; and
  - when the task process is completed at the worker determination time, not sending, by the worker node, the process-not-completed notification and waiting, by each worker node, for the synchronization completion notification from the master node.

* * * * *